United States Patent [19]
Kurata et al.

[11] 3,939,205
[45] Feb. 17, 1976

[54] PROCESS FOR HYDRATING AN UNSATURATED NITRILE

[75] Inventors: Tokuzo Kurata; Takeshi Okano; Kunihiko Ohfuchi, all of Kitakyushu; Akio Tamaru, Yokohama; Yoshifumi Murata, Kitakyushu; Saburo Nagashima, Kawasaki, all of Japan

[73] Assignee: Mitsubishi Chemical Industries Ltd., Tokyo, Japan

[22] Filed: Nov. 17, 1972

[21] Appl. No.: 307,622

[30] Foreign Application Priority Data
Nov. 19, 1971 Japan.............................. 46-092840
Apr. 24, 1972 Japan.............................. 47-041172
Sept. 1, 1972 Japan.............................. 47-087641

[52] U.S. Cl............................................. 260/561 N
[51] Int. Cl.......................................... C07c 103/08
[58] Field of Search................................. 260/561 N

[56] References Cited
UNITED STATES PATENTS
3,767,706  10/1973  Habermann et al. ........... 260/561 N

*Primary Examiner*—Lewis Gotts
*Assistant Examiner*—Ethel G. Love
*Attorney, Agent, or Firm*—Oblon, Fisher, Spivak, McClelland & Maier

[57] ABSTRACT

A copper catalyst obtained by reducing a copper compound with formaldehyde in the presence of an alkali in an aqueous medium is an excellent catalyst for the hydrolysis of an unsaturated nitrile to an amide. Furthermore, when a copper compound is combined with another element, which is selected from a specific group of elements, during the preparation of the copper catalyst, a catalyst is formed which has an increased hydrolysis activity and an increased catalyst lifetime.

15 Claims, 1 Drawing Figure

AMOUNT OF Cr ADDED AND CONVERSION OF ACRYLONITRILE

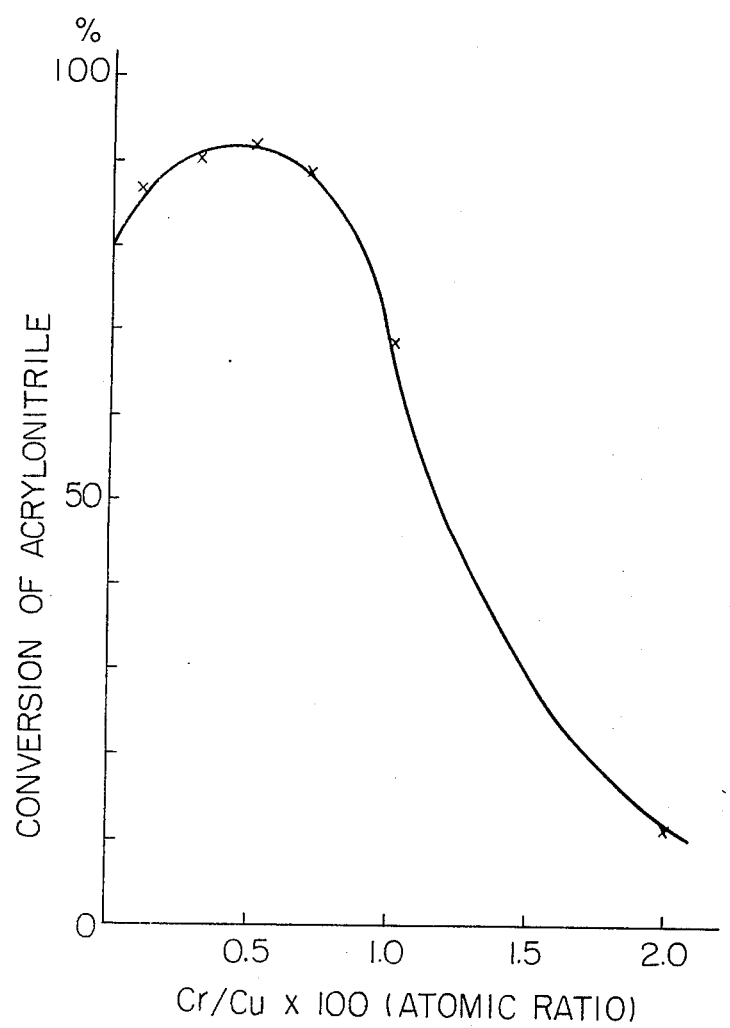

PROCESS FOR HYDRATING AN UNSATURATED NITRILE

BACKGROUND OF THE INVENTION

1. Field Of The Invention

The present invention relates to a process for hydrolyzing an unsaturated nitrile. More particularly, it relates to a process for catalytically hydrolyzing acrylonitrile or methacrylonitrile to the corresponding unsaturated amide.

2. Description Of The Prior Art

Methods for preparing substituted amides by the hydrolysis of acrylonitrile or methacrylonitrile have been known for some time. For example, acrylamide is prepared industrially by reacting acrylonitrile with water and sulfuric acid to yield acrylamide sulfate which is neutralized with an alkali. However, this method consumes a large amount of acid and alkali and is complicated.

Various materials have been known which catalyze the hydrolysis of nitriles to amides. These catalysts include copper catalysts such as copper metal, Raney copper, Ulmann copper, copper oxide, a copper catalyst obtained by reducing copper oxide or a mixture of copper oxide and other metal oxides with hydrogen, and the like. However, these catalysts are unsatisfactory from the standpoint of catalyst preparation, catalyst activity, catalyst life, and the like. A need exists, therefore, for a catalyst useful in the hydrolysis of unsaturated nitriles which is relatively easy to prepare and possesses an acceptable activity over a sufficient lifetime.

SUMMARY OF THE INVENTION

Accordingly, an object of the present invention is to provide a copper catalyst useful for the hydrolysis of unsaturated nitriles which has a high activity and a sufficient lifetime and which has a high selectivity for the production of amides.

Another object of the present invention is to provide a novel method for the preparation of copper catalysts possessing high activity.

These objects and other objects of the invention, which will hereinafter become apparent, are achieved in a process for the hydrolysis of nitriles to the corresponding amides in the presence of a copper catalyst obtained by reducing a copper compound with formaldehyde in an aqueous medium containing an alkali. The addition of a certain element selected from a specific group of elements increases the catalytic activity of the catalyst as well as its lifetime.

BRIEF DESCRIPTION OF THE DRAWING

The FIGURE shows the relationship between the degree of conversion of a nitrile as a function of the ratio of Cr to Cu in the catalyst for the hydrolysis of 6.5% acrylonitrile in an aqueous solution at 100°C. for 0.5 hour.

DESCRIPTION OF THE PREFERRED EMBODIMENTS

The copper catalyst used in the present invention is prepared by reducing a copper compound with formaldehyde. If necessary, the reduction can be performed in the presence of a specific element derived from a compound selected from a group of compounds. Suitable copper compounds include cuprous and cupric salts, copper oxide and copper hydroxide. For example, a copper salt of an inorganic acid such as copper chloride, copper nitrate, copper sulfate, and the like, a copper salt of an aliphatic acid such as copper formate, copper acetate, copper oxalate, and the like, and a copper salt of an aromatic acid such as copper benzoate, copper naphthoate, copper phenyl acetate, and the like may be used. Among these compounds, water soluble copper salts are preferable. The catalyst can be easily prepared by dissolving or suspending a copper compound in an aqueous medium and adding an alkali and formaldehyde thereto. Suitable alkalis include alkali metal hydroxides such as caustic soda, caustic potash, and the like, and alkali metal carbonates such as sodium carbonate, potassium carbonate, and the like. Caustic soda is preferably used. The source of formaldehyde used in the reduction may be a commercially available aqueous solution thereof and usually is a 37% by weight formalin solution. However, the formalin solution may be diluted or it may be diluted or it may be used in higher concentrations, if necessary.

The reduction of a cupric compound and a cuprous compound with formaldehyde is considered to proceed as indicated in the first and second equations, respectively:

$$CuCl_2 + HCHO + 3NaOH \rightarrow Cu + HCOONa + 2NaCl + 2H_2O$$
$$2CuCl + HCHO + 3NaOH \rightarrow 2Cu + HCOONa + 2NaCl + 2H_2O$$

In the preparation of the catalyst, the alkali and formaldehyde are preferably used in excess of the stoichiometric amount required to completely reduce the copper in order that the reduction may proceed to completion and that no unreduced copper remains in the catalyst. The quantity of alkali generally used ranges from 4 to 10 moles per one mole of copper compound. Formaldehyde is usually used in amounts ranging from 2 to 40 times, preferably 4 to 20 times, the stoichiometric amount required. No particular order is required for the addition of alkali and formaldehyde. Either formaldehyde may be added to a mixture of the copper compound and the alkali in an aqueous medium to reduce the copper compound, or the alkali may be added to a mixture of the copper compound and formaldehyde. Preferably, the reduction is accomplished by the gradual addition of formaldehyde to a mixture of the copper compound and the alkali. The reduction reaction is performed at temperatures ranging from 10° to 200°C.

A catalyst of extremely high activity can be obtained by mixing the copper compound and alkali in an aqueous medium, while raising the temperature in order to induce precipitation of a copper compound, and gradually adding formaldehyde thereto. When an aqueous solution of the copper compound is initially treated with alkali and then reduced with formaldehyde, the temperature of the solution is maintained in different ranges when treated with both reagents. Thus, when the copper containing solution is mixed with alkali, the temperature is usually maintained from 70° to 200°C., preferably 70° to 100°C. Catalysts obtained from a preparation in which the temperature is lower than the indicated range do not have sufficient activity. When the alkali-copper compound containing solution is treated with formaldehyde which results in a black precipitate, the temperature of the solution is maintained in a range from 10° to 70°C., preferably 20° to 70°C. If the temperature is lower than this range, the rate of reduction is too low for practical use. On the other hand, if the temperature is too high, the activity of the resulting catalyst is not satisfactory.

The copper catalyst of this invention is preferably modified by the presence of another metallic compound, which improves the activity and increases the lifetime of the catalyst. Various types of metal compounds are suitable for use. Suitable compounds include those which contain elements selected from the group consisting of Group Ib elements having an atomic number of 47 to 79, Group IIa and Group IIb elements having an atomic number of 4 to 80, Group IIIa and Group IIIb elements having an atomic number of 13 to 92, Group IVa and Group IVb elements having an atomic number of 14 to 82, Group Va and Group Vb elements having an atomic number of 15 to 83, Group VIa elements having an atomic number of 24 to 74, Group VIIa elements having an atomic number of 25 to 75, and Group VIII elements having an atomic number of 26 to 78. Representative examples of these compounds include compounds containing the elements Ag, Au, Be, Mg, Ca, Sr, Ba, Zn, Cd, Hg, Al, Sc, Y, La, U, Ga, In, Tl, Si, Ti, Zr, Hf, Ge, Sn, Pb, P, V, Nb, Ta, As, Sb, Bi, Cr, Mo, W, Mn, Re, Fe, Co, Ni, Ru, Rh, Pd, Os, Ir, and Pt. Among the compounds which are preferred are those which contain Cr, Mo, Ti, V, Zr, Fe, Ru, Pd, W and Si, particularly since they heighten the hydrolysis activity of the catalyst and the selectivity for the amide product.

The types of compounds used are not limited, and include halides such as chlorides and bromides; hydroxides, oxides, inorganic acid salts such as sulfate, nitrate, oxyacid salts, phosphate, and the like; and organic acid salts such as formates, acetates, oxalates, and the like. In addition, organometallic compounds and other coordinate metal complexes may also be used. The amount of the metal compound used is usually within a range such that the element is present in amounts which yield an atomic ratio of 0.0005 to 0.05 of element to copper in the catalyst. The optimum application range cannot be precisely defined since the amount used varies depending upon the type of compound and the kind of element. For example, a Cr-compound may be used such that the atomic ratio of Cr to Cu is 0.0005 to 0.008, preferably 0.001 to 0.007. It is apparent from the FIGURE, that optimum conversion of acrylonitrile occurs within the preferred atomic ratio range indicated for the chromium-copper catalyst.

The FIGURE shows the relationship between the degree of conversion of nitrile as a function of the variation in the Cr: Cu atomic ratio in the situations where aqueous solutions of 6.5% acrylonitrile were reacted at 100°C. for 0.5 hour with 0.5 g. of a copper catalyst containing various amounts of chromium prepared from chromium nitrate. As the ratio of Cr/Cu exceeds its optimum value, i.e., as the amount of Cr increases, the degree of conversion of acrylonitrile sharply decreases. This illustrates the effectiveness by which small amounts of chromium within the specified range greatly improve the activity of the catalyst. The reason for the enhanced activity imparted to the copper catalyst by the presence of chromium has not been fully established. However, it is supposed that chromium modifies the surface of the copper catalyst in some manner during the preparation of the catalyst by the reduction of a copper compound with formalin.

The desirable application ranges of some other elements in the copper catalyst are shown in Table I.

TABLE I

| No. | M (elements) | Content, (M-atom/Cu-atom) × 100 | |
|---|---|---|---|
| | | General range | Preferable range |
| 1 | Cr | 0.05 – 0.8 | 0.1 – 0.7 |
| 2 | Mo | 0.05 – 2 | 0.1 – 1.5 |
| 3 | Ti | 0.05 – 3 | 0.1 – 2 |
| 4 | V | 0.03 – 3 | 0.05 – 2.1 |
| 5 | Zr | 0.05 – 3 | 0.1 – 2 |
| 6 | Fe | 0.05 – 3 | 0.1 – 2 |
| 7 | Ru | 0.01 – 5 | 0.02 – 3 |
| 8 | Pd | 0.05 – 3 | 0.1 – 3 |
| 9 | W | 0.05 – 2 | 0.1 – 1.5 |
| 10 | Si | 0.01 – 10.0 | 0.01 – 5.0 |

These compounds should be incorporated in the catalyst during its synthesis when the copper compound is reduced with formalin in the presence of an alkali in an aqueous medium. The mode of addition of these compounds is not particularly limited. As an example, an additive compound and a copper compound may be added, separately or as a mixture, to an aqueous alkali solution, and subsequently reduced with formalin, or the additive compound dissolved in formalin may be added to the aqueous alkali solution containing the copper compound. The additive compounds may be used alone or in combination with one another. A particularly desirable combination is the combination of a chromium compound with a silicon compound.

The catalyst of this invention may also be used on a carrier. Suitable carriers include alumina, silica, diatomaceous earth, active carbon, and the like. The catalyst may be supported on a carrier by suspending the carrier in an aqueous solution containing a copper compound and an additive compound and then reducing the copper compound with formalin.

The hydrolysis of nitriles according to the process of this invention is usually conducted at a temperature between room temperature and 300°C. with the catalyst of this invention. No advantage is gained by elevating the reaction temperature too much since the acrylamide or methacrylamide produced is very reactive and apt to undergo side reactions. However, as expected, higher reaction temperatures lead to greater reaction velocities. The reaction is preferably conducted at a temperature of 50° to 150°C. to ensure a high selectivity for amide and an adequate reaction velocity.

The reaction may be conducted in the presence of an amount of water which is less than the stoichiometric amount required. However, the quantity of water used ranges from several times to several orders of magnitude times the theoretical amount required. An inert medium may also be used as an adjunct to the water. The reaction is usually conducted in the liquid phase, although it may also be run in the gaseous phase. When the reaction is conducted in the liquid phase, the aqueous solution of the nitrile is concentrated as much as possible in order to leave a concentrated aqueous solution of the product amide. However, too high a concentration of the nitrile in the aqueous solution results in an inhomogeneous solution because the nitriles used have a limited solubility in water. A high concentration of the product amide in an aqueous solution can be obtained by using a solvent adjunct powerful enough to dissolve the amide, such as dimethylformamide, and the like. This permits a lesser amount of water in the reaction medium and results in a homogeneous liquid phase from which the solvent may be removed to yield the reaction product.

The reaction may be conducted by any conventional type of catalytic reaction using a fixed bed, a suspension bed, or the like. Also, the reaction system may desirably contain a polymerization inhibitor, such as hydroquinone, tertiary butylcatechol, a metallic salt, and the like. By the process of this invention, acrylamide and methacrylamide can be manufactured from the corresponding nitriles.

Having generally described the invention, a further understanding can be obtained by reference to certain specific examples which are provided herein for purposes of illustration only and are not intended to be limiting unless otherwise specified.

EXAMPLE 1

A solution containing 0.1 mole of cupric chloride dissolved in 100 ml. of water was placed in a 500 ml. three-necked flask provided with a thermometer, a stirrer and a dropping funnel. A 50 g. quantity of commercially available 37% formalin solution was gradually added dropwise to the solution. This was followed by the dropwise addition of a solution of 75 g. of caustic soda dissolved in 200 ml. of water. The initial temperature of the cupric chloride solution was room temperature but, after the addition of the reagents, the temperature of the solution increased to 45°C. The temperature of the solution was raised to 60°C. and stirring was continued for 30 minutes. Next, the supernatant fluid was removed by decantation and the precipitated copper metal was washed several times with a degassed and demineralized water and thereafter was dried to yield the catalyst. A 1 g. quantity of this catalyst and 10 ml. of a 6.5% aqueous acrylonitrile solution were placed into a 20 ml. glass reactor previously purged with nitrogen and were reacted in a thermoregulated bath of the shaking type at 100°C. for 1 hour. Analysis of the reaction showed an 80.5% conversion of acrylonitrile and a 92.7% selectivity to acrylamide.

EXAMPLE 2

A 17 g. quantity of a commercially available 37% formalin solution and a solution of 0.6 mole of caustic soda dissolved in 100 ml. of water were added in this order to an aqueous solution containing 0.1 mole of cupric chloride dissolved in 100 ml. of water at room temperature, and thereafter, the temperature of the liquid was raised to 70°C. A 33 g. quantity of formalin was then added to the solution and it was stirred at 80°C. for 30 minutes. The precipitated copper metal was treated in the same manner as described in Example 1 to prepare a catalyst. Next, the hydrolysis reaction of acrylonitrile was run using the catalyst obtained in the same manner as described in Example 1. Analysis of the reaction showed a 100% conversion of acrylonitrile and a 91.9% selectivity to acrylamide. In the case where the reaction time was decreased to 0.5 hour, the conversion of acrylonitrile was 86.7% and the selectivity to acrylamide was 96.3%.

EXAMPLE 3

An aqueous solution of 24 g. of caustic soda dissolved in 200 ml. of water was placed in a three-necked flask similar to that of Example 1, and was maintained at 70°C. A liquid containing 17 g. of $CuCl_2 \cdot 2H_2O$ dissolved in 100 ml. of water was added thereto. Thereafter, the temperature of the contents of the vessel was adjusted to 60°C. and, while maintaining this temperature, 32 g. of a 37% formalin solution were added dropwise over a period of 30 minutes. The solution was stirred at the same temperature for an additional 30 minutes. Next, the supernatant liquid was removed and the precipitated copper metal was washed several times with a degassed and demineralized water and thereafter was dried to yield the catalyst. Using the catalyst obtained, a hydrolysis reaction of acrylonitrile was conducted in the same manner outlined in Example 1, except that the reaction time was 0.5 hour. Analysis of the reaction indicated an 85.1% conversion of acrylonitrile to acrylamide and a 99.8% selectivity to acrylamide.

EXAMPLE 4

A 0.6 mole quantity of caustic soda dissolved in 100 ml. of water was added to a solution containing 0.1 mole of cupric chloride dissolved in 100 ml. of water, and the mixture was stirred at 90°C. for 30 minutes. Thereafter, 32 g. of a commercially available 37% formalin solution was added and the resulting mixture was stirred at 90°C. for 30 minutes. The precipitated copper metal was treated in the same manner as described in Example 1 to prepare a catalyst. Next, the hydrolysis reaction of acrylonitrile was run using the catalyst obtained in the same manner as described in Example 1, except that the reaction time was 0.5 hour. Analysis of the reaction indicated a 93.9% conversion of acrylonitrile to acrylamide and a 97.5% selectivity to acrylamide.

EXAMPLES 5 to 9

A solution containing 24 g. of caustic soda dissolved in 200 ml. of water was placed in the same flask used in Example 1 and was maintained at a temperature of 90°C. Next, a solution containing Cu-Cr prepared by dissolving 17 g. of $CuCl_2 \cdot 2H_2O$ and a specific amount of the chromium compounds shown in Table II in 100 ml. of water was added to the solution in the flask with stirring at 90°C. for 30 minutes. Thereafter, 32 g. (0.4 mole) of a commercially available 37% formalin solution was gradually added dropwise over a period of 30 minutes. After addition of the reagents, stirring was continued at the same temperature for an additional 30 minutes. Next, the supernatant liquid was removed by decantation, and the precipitated copper metal composition was washed several times with a degassed and demineralized water and thereafter was dried to yield the catalyst. Using the catalyst obtained, the hydrolysis reaction of acrylonitrile was conducted in the same manner as described in Example 3. The results are shown in Table II.

TABLE II

| | Catalyst | | Reaction result | |
|---|---|---|---|---|
| No. | Chromium compound | Cr/Cu* × 100 | Conversion of acrylonitrile, (%) | Selectivity of acrylamide, (%) |
| 5 | $Cr(NO_3)_3 \cdot 9H_2O$ | 0.1 | 86.5 | 99.8 |
| 6 | $Cr(NO_3)_3 \cdot 9H_2O$ | 0.3 | 90.2 | 99.8 |
| 7 | $Cr(NO_3)_3 \cdot 9H_2O$ | 0.5 | 91.7 | 99.8 |
| 8 | $Cr_2(SO_4)_3 \cdot 15H_2O$ | 0.5 | 88.3 | 99.8 |
| 9 | $CrCl_3 \cdot 6H_2O$ | 0.5 | 88.6 | 99.8 |

*Cr/Cu means the atomic ratio of the additive chromium compound to the copper compound.

EXAMPLE 10

A solution containing 24 g. of caustic soda dissolved in 100 ml. of water was placed in the same flask used in Example 1 and, while maintaining the temperature shown in the column labeled as "neutralization temperature" in Table III, an aqueous solution prepared by dissolving 17 g. of $CuCl_2 \cdot 2H_2O$ and 0.2 g. of $Cr(NO_3)_3 \cdot 9H_2O$ in 100 ml. of water was added thereto. The temperature was then adjusted to the corresponding temperature shown in the column labeled as "reduction temperature" in Table III, and, while maintaining this temperature, 32 g. of a 37% formalin solution were added dropwise over a period of 30 minutes. After addition of the reagents, stirring was continued at the same temperature for an additional 30 minutes. Next, the supernatant liquid was removed and the precipitated copper metal composition was washed several times with a degased and demineralized water and was dried to yield the catalyst. Using the catalyst obtained, the hydrolysis reaction of acrylonitrile was conducted in the same manner described in Example 3. The results obtained are shown in Table III.

TABLE III

| Catalyst No. | Neutralization temp., (°C.) | Reduction temp., (°C.) | Conversion of acrylonitrile, (%) | Selectivity of acrylamide, (%) |
|---|---|---|---|---|
| 1 | 90 | 40 | 98.9 | 99.8 |
| 2 | 70 | 60 | 97.1 | 99.8 |
| 3 | 70 | 30 | 97.3 | 99.8 |

EXAMPLE 11

Different catalysts were prepared by adding the various compounds shown in Table IV to solutions of $CuCl_2 \cdot 2H_2O$ in the same manner as described in Example 9, except that the temperatures of neutralization and reduction were 90°C. In these preparations, solutions containing the additive compounds were dissolved in either an alkali solution, an aqueous solution of a copper salt or a formalin solution. The methods of addition are shown in Table IV as "in alkali", "in copper salt solution", and "in formalin", respectively. The hydrolysis reactions of acrylonitrile were conducted using the catalysts obtained in the same manner as described in Example 3. The results are shown in Table IV. In all of the hydrolysis reactions, only small amounts of ethylenecyanohydrin, acrylic acid, and the like were produced, indicating a high selectivity in the conversion of acrylonitrile to acrylamide.

TABLE IV

| No. | Additive Element | Amount added | Kind of compound | Method of addition | Conversion, % | Selectivity, % |
|---|---|---|---|---|---|---|
| 1 | Cr | 0.5 | $CrO_3$ | in copper salt solution | 88.0 | 99.7 |
| 2 | " | " | $Na_2Cr_2O_7 \cdot 2H_2O$ | in alkali | 91.5 | 99.5 |
| 3 | " | " | $Na_2Cr_2O_7 \cdot 2H_2O$ | in formalin | 96.5 | 99.5 |
| 4 | Mo | " | $Na_2MoO_4 \cdot 2H_2O$ | in alkali | 84.0 | 97.8 |
| 5 | Ti | 0.5 | $TiCl_4$ | in copper salt solution | 91.1 | 97.5 |
| 6 | " | 1.0 | $Ti(SO_4)_2$ | " | 93.7 | 99.3 |
| 7 | V | 1.0 | $V_2O_5$ | in alkali | 86.0 | 99.5 |
| 8 | " | " | $NH_4VO_3$ | in alkali | 93.6 | 99.4 |
| 9 | V | 1.0 | $NaVO_3$ | in alkali | 89.4 | 99.6 |
| 10 | " | " | $VCl_3$ | in copper salt solution | 92.4 | 99.5 |
| 11 | " | " | $V_2O_5$ | " | 88.0 | 99.4 |
| 12 | Zr | 0.5 | $ZrO(NO_3)_2 \cdot 2H_2O$ | " | 84.0 | 97.8 |
| 13 | " | 1.0 | " | " | 82.0 | 98.7 |
| 14 | Fe | 0.5 | $FeCl_3$ | " | 86.7 | 99.5 |
| 15 | " | " | $Fe_2(SO_4)_3 \cdot 6H_2O$ | " | 90.6 | 99.4 |
| 16 | " | " | $Fe(NO_3)_3 \cdot 9H_2O$ | " | 89.4 | 99.2 |
| 17 | Ru | 0.5 | $RuCl_3 \cdot H_2O$ | " | 94.1 | 99.5 |
| 18 | Pd | 0.5 | $PdCl_2$ | " | 90.0 | 97.5 |
| 19 | W | 0.5 | $Na_2WO_4$ | in alkali | 83.0 | 99.6 |
| 20 | Si | 0.5 | $Na_2SiO_3 \cdot 9H_2O$ | " | 83.0 | 99.3 |
| 21 | " | 5.0 | " | " | 88.9 | 99.5 |
| 22* | " | 3.0 | " | " | 85.0 | 99.4 |
| 23 | Cr / Si | 0.5 / 0.5 | $Cr(NO_3)_3 \cdot 9H_2O$ / $Na_2SiO_3 \cdot 9H_2O$ | in copper salt solution / in alkali | 96.4 | 99.7 |
| 24 | Cr / Si | 0.5 / 2.0 | $Cr(NO_3)_3 \cdot 9H_2O$ / $Na_2SiO_3 \cdot 9H_2O$ | in copper salt solution / in alkali | 97.8 | 99.5 |
| 25 | Cr / Si | 0.5 / 5.0 | $Cr(NO_3)_3 \cdot 9H_2O$ / $Na_2SiO_3 \cdot 9H_2O$ | in copper salt solution / in alkali | 98.2 | 99.6 |

(1) The asterisk indicates that the amount of formalin used was double the amount normally used in the preparation of catalyst.

(2) In the Table, the "amount added" is expressed as element added/Cu (atomic ratio) × 100.

Having now fully described the invention, it will be apparent to one of ordinary skill in the art that many changes and modifications can be made thereto without departing from the spirit or scope of the invention as set forth herein. Accordingly,

What is claimed as new and intended to be covered by Letters Patent is:

1. A process for preparing an amide, which comprises hydrolyzing acrylonitrile or methacrylonitrile to the corresponding amide in the presence of a copper catalyst obtained by reducing copper oxide, copper hydroxide, a copper salt of an inorganic acid, a copper salt of an aliphatic acid or a copper salt of an aromatic acid with formaldehyde in the presence of an alkali in an aqueous medium.

2. The process of claim 1, wherein said copper catalyst is obtained by reducing said copper oxide, copper hydroxide or copper salt with formaldehyde in the presence of caustic soda at a temperature of 10° to 200°C.

3. The process of claim 1, wherein said copper catalyst is obtained by mixing said coper oxide, copper hydroxide or copper salt with an alkali in an aqueous medium at a temperature of 70° to 200°C. to produce a precipitate, and subsequently reducing said precipitate with formaldehyde at a temperature of 10° to 70°C.

4. The process of claim 1, wherein said copper salt of an inorganic acid is copper chloride, copper nitrate or copper sulfate.

5. The process of claim 1, wherein said copper salt of an aliphatic acid is copper formate, copper acetate or copper oxalate.

6. The process of claim 1, wherein said copper salt of an aromatic acid is copper benzoate, copper naphthoate or copper phenylacetate.

7. A process for preparing an amide which comprises hydrolyzing acrylonitrile or methacrylonitrile to the corresponding amide over a catalyst obtained by reducing copper oxide, copper hydroxide, or a copper salt of an inorganic acid, a copper salt of an aliphatic acid or a copper salt of an organic acid with formaldehyde in an aqueous medium containing an alkali in the presence of a compound containing an element selected from the group consisting of Group IVa and Group IVb elements having an atomic number of 14 to 82, Group Vb elements having an atomic number of 23 to 73, Group VIa elements having an atomic number of 24 to 74, Group VIIa elements having an atomic number of 25 to 75 and Group VIII elements having an atomic number of 26 to 78.

8. The process of claim 7, wherein said element is selected from the group consisting of Cr, Mo, Ti, V, Zr, Fe, Ru, Pd, W and Si.

9. The process of claim 7, wherein said catalyst contains an element to copper atomic ratio in the range of 0.0005 to 0.05.

10. The process of claim 7, wherein said catalyst is obtained by reducing said copper oxide, copper hydroxide or copper salt with formaldehyde in the presence of caustic soda and a compound containing said element at a temperature of 10° to 200°C.

11. The process of claim 8, wherein said catalyst contains an element to copper atomic ratio in the range of 0.0005 to 0.05.

12. The process of claim 8, wherein said catalyst prepared by reacting a copper oxide, copper hydroxide or copper salt with an alkali in an aqueous medium at a temperature of 70° to 200°C. in the presence of a compound containing said element produces a precipitate which precipitate is subsequently reduced with formaldehyde at a temperature of 10° to 70°C.

13. The process of claim 7, wherein said compound containing said element is a chromium compound which is combined with said copper oxide, copper hydroxide or copper salt to produce said catalyst containing a chromium to copper atomic ratio ranging from 0.0005 to 0.008.

14. The process of claim 7, wherein said compound containing said element is a mixture of a chromium compound and a silicon compound.

15. The process of claim 12, wherein said catalyst has a chromium to copper atomic ratio ranging from 0.0005 to 0.008 and a silicon to copper atomic ratio ranging from 0.01 to 5.0.

* * * * *